(12) United States Patent
Rothbauer et al.

(10) Patent No.: US 9,279,361 B2
(45) Date of Patent: Mar. 8, 2016

(54) PISTON BOWL WITH SPRAY JET TARGETS

(75) Inventors: Rainer J. Rothbauer, San Antonio, TX (US); Charles E. Roberts, Jr., Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 1071 days.

(21) Appl. No.: 12/763,484

(22) Filed: Apr. 20, 2010

(65) Prior Publication Data

US 2011/0253095 A1 Oct. 20, 2011

(51) Int. Cl.
*F02F 3/26* (2006.01)
*F02B 19/00* (2006.01)
*F02B 23/06* (2006.01)

(52) U.S. Cl.
CPC ......... *F02B 23/0696* (2013.01); *F02B 23/0627* (2013.01); *F02B 23/0651* (2013.01); *F02F 3/26* (2013.01); *Y02T 10/125* (2013.01)

(58) Field of Classification Search
CPC ............. F02B 23/0696; F02B 23/0627; F02B 23/0651; F02F 3/26; Y02T 10/125
USPC ............... 123/193.6, 253, 261, 276, 279, 280
See application file for complete search history.

(56) References Cited

U.S. PATENT DOCUMENTS

| | | | |
|---|---|---|---|
| 2,231,392 A | 2/1941 | McCarthy | |
| 2,762,348 A * | 9/1956 | Meurer | 123/279 |
| 2,766,738 A * | 10/1956 | Hoffmann | 123/269 |
| 2,942,591 A * | 6/1960 | Meurer | 123/263 |
| 3,039,445 A * | 6/1962 | Thornton Crowther et al. | 123/263 |
| 4,221,190 A * | 9/1980 | Komiyama et al. | 123/263 |
| 4,274,375 A * | 6/1981 | Kupper et al. | 123/263 |
| 4,281,629 A * | 8/1981 | List | 123/279 |
| 4,311,122 A | 1/1982 | Banba et al. | |
| 4,770,138 A | 9/1988 | Onishi | |
| 4,779,587 A | 10/1988 | Schweinzer et al. | |
| 4,942,804 A | 7/1990 | Matsuura et al. | |
| 5,065,715 A | 11/1991 | Evans | |
| 5,103,784 A | 4/1992 | Evans | |
| 5,121,722 A | 6/1992 | Horiuchi | |
| 5,136,994 A | 8/1992 | Gale | |
| 5,215,052 A * | 6/1993 | Augustin | 123/276 |
| 5,224,449 A | 7/1993 | Fukano et al. | |
| 5,329,901 A | 7/1994 | Onishi | |

(Continued)

FOREIGN PATENT DOCUMENTS

JP 2004190572 A * 7/2004

OTHER PUBLICATIONS

U.S. Office Action, mailing date Jun. 6, 2013 issued in U.S. Appl. No. 12/773,344 (9 pgs) (SWR3458).

(Continued)

*Primary Examiner* — Mahmoud Gimie
*Assistant Examiner* — David Hamaoui
(74) *Attorney, Agent, or Firm* — Grossman, Tucker et al.

(57) ABSTRACT

A piston for a direct injection engine is provided, the piston having a bowl at an upper end, the bowl forming a portion of a combustion chamber. The bowl includes an inner surface that defines a volume configured to receive a fuel-air mixture, the inner surface of the bowl including at least one surface feature as a target for the fuel spray, the surface feature angled 20° to 80° from the piston face. The surface feature may protrude from the inner surface of the bowl or may be recessed into the inner surface. Such surface features may reduce soot and improve fuel-air mixing.

8 Claims, 9 Drawing Sheets

(56) References Cited

U.S. PATENT DOCUMENTS

| | | | |
|---|---|---|---|
| 5,357,924 A | 10/1994 | Onishi | |
| 5,535,716 A | 7/1996 | Sato et al. | |
| 5,873,344 A | 2/1999 | Kudou et al. | |
| 6,237,579 B1 | 5/2001 | Singh | |
| 6,336,437 B1 | 1/2002 | Baika et al. | |
| 6,539,910 B1 * | 4/2003 | Gaiser et al. | 123/193.6 |
| 6,601,561 B1 | 8/2003 | Liu et al. | |
| 6,651,612 B2 | 11/2003 | Kobayashi | |
| 6,701,875 B2 * | 3/2004 | Weng et al. | 123/41.35 |
| 6,708,666 B2 | 3/2004 | Roberts, Jr. | |
| 6,739,308 B1 | 5/2004 | Curtis | |
| 6,892,689 B2 | 5/2005 | Bischofberger et al. | |
| 6,955,165 B2 | 10/2005 | Liu | |
| 6,997,158 B1 | 2/2006 | Liu | |
| 7,096,848 B2 | 8/2006 | Ono et al. | |
| 7,131,418 B2 | 11/2006 | Wieland | |
| 7,185,614 B2 * | 3/2007 | Meffert et al. | 123/41.35 |
| 7,318,406 B2 | 1/2008 | Yi et al. | |
| 7,441,535 B2 | 10/2008 | Yuzaki et al. | |
| 8,424,506 B2 * | 4/2013 | Hasegawa | 123/279 |
| 8,459,229 B2 * | 6/2013 | Rothbauer et al. | 123/276 |
| 2003/0066507 A1 | 4/2003 | Roberts, Jr. | |
| 2003/0217732 A1 | 11/2003 | Kataoka et al. | |
| 2006/0090726 A1 | 5/2006 | Meffert et al. | |
| 2006/0201143 A1 | 9/2006 | Jacobsson et al. | |
| 2007/0163535 A1 | 7/2007 | Walter | |
| 2009/0188481 A1 | 7/2009 | Zhu et al. | |
| 2009/0205607 A1 | 8/2009 | Levy | |
| 2010/0206263 A1 | 8/2010 | Hasegawa | |
| 2010/0258076 A1 | 10/2010 | Eismark et al. | |
| 2011/0146613 A1 | 6/2011 | Oxborrow et al. | |
| 2011/0253094 A1 | 10/2011 | Rothbauer et al. | |
| 2011/0259297 A1 * | 10/2011 | Rothbauer et al. | 123/276 |
| 2011/0271931 A1 * | 11/2011 | Rothbauer et al. | 123/279 |

OTHER PUBLICATIONS

U.S. Office Action, mailing date Aug. 23, 2012 issued in U.S. Appl. No. 12/767,531 (8 pgs).

U.S. Office Action, mailing date Mar. 5, 2013 issued in U.S. Appl. No. 12/767,531 (6 pgs) (SWR3457).

U.S. Office Action, mailing date Sep. 20, 2012 issued in U.S. Appl. No. 12/763,468 (5 pgs) (SWR3455).

* cited by examiner

PISTON BOWL WITH SPRAY JET TARGETS

FIELD OF THE INVENTION

The present disclosure relates to a piston and an associated method of utilizing the piston within a direct injection engine wherein one or more surface features included in the bowl of the piston may be configured as targets for an injected fuel spray. The deflection of the spray off separate geometries within the piston bowl may provide more mixing time and relatively lower jet-jet interaction improving the distribution of fuel along with an effect on, e.g., NOx, soot emission and/or heat release.

BACKGROUND

Modern day engines must meet ever-more stringent emission regulations while remaining as fuel efficient as possible. Such engines may be designed to meet extremely strict NOx and particulate matter regulations. The use of high levels of exhaust gas recirculation (EGR) to reduce NOx emissions may have an unfortunate side effect of increasing the emission of particulate matter (PM) or soot. There may be multiple approaches to achieve the emission targets and to reduce the particulate matter to levels which current after-treatment systems may be able to tolerate, each approach having its own advantages and disadvantages. Besides strategies like high injection pressure and late injection timing, after-treatment systems may be used to reduce both the NOx and particulate matter, but at a relatively higher initial coast for the engine/after-treatment system. This higher cost and complexity may result in a potential benefit for an in-cylinder emission reduction solution.

To meet the goals of reduced emissions and fuel efficiency, combustion chamber design may provide an opportunity to improve burn rate and fuel consumption while improving the fuel-air mixing rate so that particulate emissions may be reduced. High injection pressure systems may provide not only small droplets and more oxygen entrainment in the fuel/air mixture, but also may provide high momentum jets of fuel, which may be used to distribute the fuel to oxygen-rich regions within the combustion chamber. Due to the increased lift-off length and oxygen entrainment from the high injection pressure, the burning zone may now be moved closer to the bowl wall.

Traditional combustion system development has concentrated on axial symmetric bowl shapes. The traditional piston bowl shape may serve as a starting point for improvement, however, these shapes are generally 2-dimensional (smooth surfaced).

SUMMARY

In a first embodiment, the present disclosure relates to a piston for a direct injection engine, the piston comprising a bowl at an upper end, the bowl forming a portion of a combustion chamber, wherein the piston has a top face defining a plane and the bowl includes an inner surface that defines a volume configured to receive a fuel-air mixture, the inner surface of the bowl including at least one surface feature recessed into or protruding from the inner surface as a target for fuel spray, the at least one surface feature angled between 20° and 80° from the plane of the top face and having a cross-section that protrudes from or is recessed into the inner surface by 0.5 mm to 12.7 mm.

In a second exemplary embodiment, the present disclosure relates to a piston for a direct injection engine, the piston comprising a bowl at an upper end, the bowl forming a portion of a combustion chamber, wherein the piston has a top face defining a plane and the bowl includes an inner surface that defines a volume configured to receive a fuel-air mixture, the inner surface of the bowl including at least one surface feature recessed into or protruding from the inner surface as a target for fuel spray, the at least one surface feature including a central portion angled between 20° and 80° from the plane of the top face and having a cross-section that protrudes from or is recessed into the inner surface by 0.5 mm to 12.7 mm, wherein edges formed as a recess or projection are disposed adjacent the top and bottom and along the central portion of the shaped feature.

In another exemplary embodiment, the present disclosure relates to a method of operating an internal combustion engine having at least one cylinder and a piston slidably disposed within the at least one cylinder, the method comprising moving the piston toward a top dead center position during a compression stroke and spraying a fuel and air mixture into a piston bowl recessed in the piston, wherein the piston has a top face defining a plane and the bowl includes an inner surface that defines a volume configured to receive the fuel-air mixture, the inner surface of the bowl including at least one surface feature recessed into or protruding from the inner surface as a target for fuel spray. The at least one surface feature may be angled between 20° and 80° from the plane of the top face and have a cross-section that protrudes from or is recessed into the inner surface by 0.5 mm to 12.7 mm, wherein the at least one surface feature redirects the fuel-air mixture upon impact with the target to provide additional fuel-air mixing.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Various features of the present invention will now become readily apparent to those skilled in the art from the following detailed description, wherein the invention is shown along with certain preferred embodiments. As will be realized the invention is capable of other and different embodiments, and its several details are capable of modification in various respects. Accordingly, the description is to be regarded as illustrative in nature and not as restrictive.

Today's high pressure injection systems for engines deliver a large amount of kinetic energy which can now be utilized to form a favorable distribution of fuel in the combustion chamber which may be applicable for diesel engines. The mixture distribution may now be influenced by the geometry of the spray impact zone along the inner surfaces of the piston bowl thus affecting the formation of emissions as well as heat release. In this disclosure, fuel-jet/bowl-wall interaction is employed to improve combustion characteristics. The bowl shapes may include various types of geometric features on and/or around the inner surfaces of the bowl of the piston to enhance performance. As noted above, the deflection and separation geometries within the piston bowl may now improve the distribution of fuel along with an effect on, e.g., NOx formation, soot emission and/or heat release. For example, soot may be reduced as compared to those pistons that do not incorporate the features noted herein.

While the disclosure is now discussed primarily with respect to diesel engines, it is contemplated that the features of the invention would be applicable to any engine using direct injection of fuel, for instance, gasoline or natural gas. Reference to direct injection of fuel may be understood as the injection of fuel into a cylinder containing a piston where the fuel is ignited to provide piston movement.

Computational Fluid Dynamic (CFD) modeling was used to identify the various piston bowl surface features, particularly edges, formed in the surface of a piston bowl which may now be used as solid obstacle targets within the spray jet path. This then may increase air entrainment due to improved atomization and penetration of the fuel spray into the air. As noted herein, such improved entrainment herein results in a reduction in soot (particulate matter) emissions. Such reduction may also now occur without a relative increase in NOx emissions. Initially, one may utilize a simulated spray chamber having a surface feature along one wall which is the target of the spray jet. This was then followed by confirmation studies utilizing a complete piston bowl geometry containing the identified surface feature.

Figure 1:
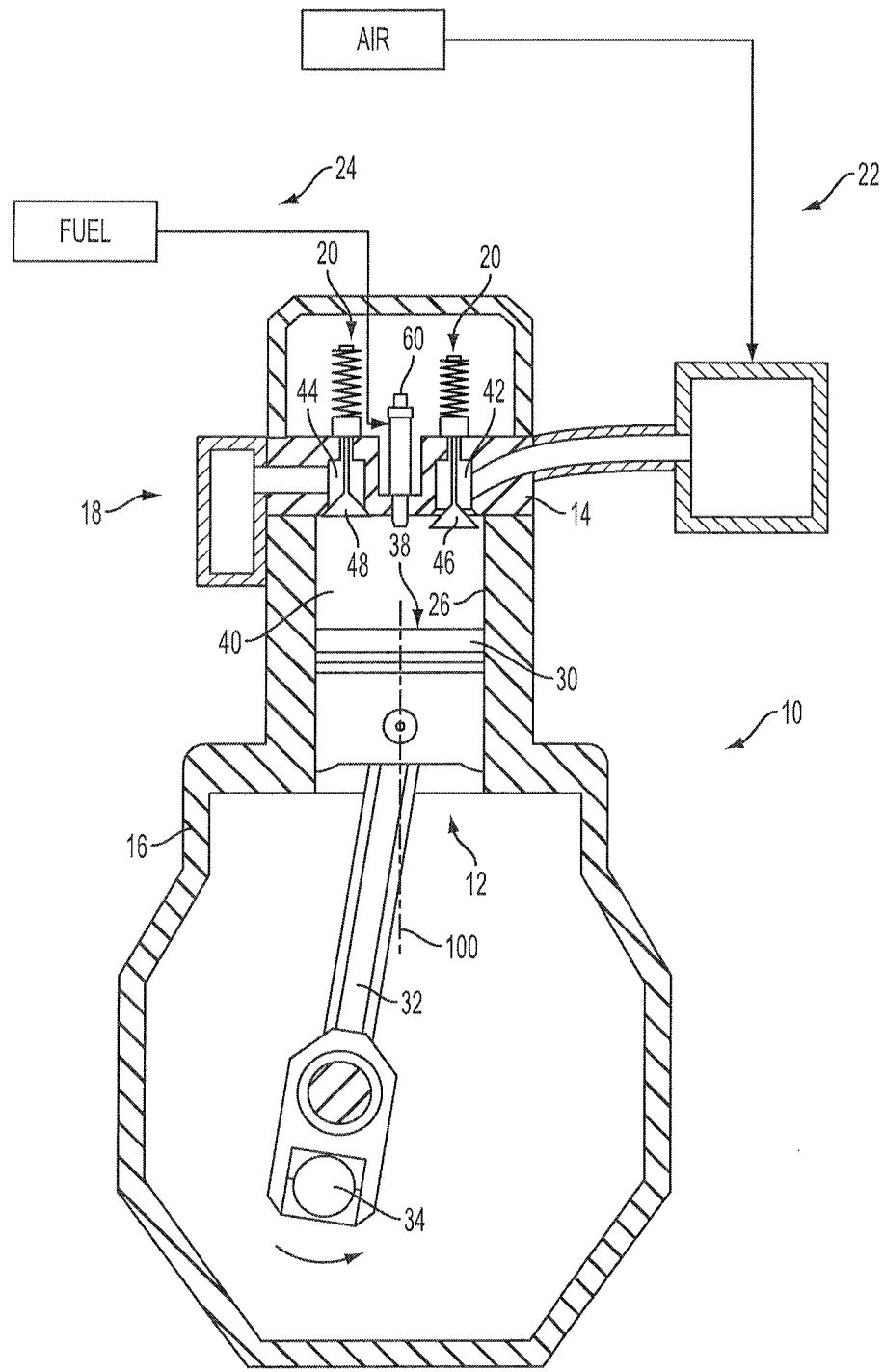
FIG. 1 is a schematic illustration of an exemplary internal combustion engine.

For reference purposes, FIG. 1 is a schematic illustration of an exemplary internal combustion engine showing one of a plurality of cylinders in sectional view. Such an internal combustion engine 10 may include a plurality of piston assemblies 12 and a cylinder head 14 associated with each piston assembly surrounded by an engine block 16, an exhaust system 18, a valve actuation system 20, an air induction system 22 and a fuel supply system 24. The piston assembly 12 may be slidably disposed within a cylinder 26. Piston assembly 12 may include a piston 30 pivotally connected to a connecting rod 32, which is pivotally connected to a crankshaft 34. A rotation of the crankshaft 34 may result in a sliding motion of piston 30 within the cylinder 26. The cylinder head 14 and end of the piston 30 form a combustion chamber 40. The combustion chamber 40 may include an intake port 42 and an exhaust port 44 and intake valve 46 and exhaust valve 48 disposed within the respective ports. At least one fuel injector 60 may be disposed within the cylinder head 14 to inject fuel into the combustion chamber at a predetermined time. Such injector may be located on the centerline 100 of the cylinder head (as shown) or may be offset from such centerline. The face 38 of piston 30 may surround a curved surface against which combustion gases may exert pressure to drive the piston downward. In the present disclosure, this curved surface may be a generally annular concave recess or bowl 50 as shown in FIG. 2.

Figure 2:
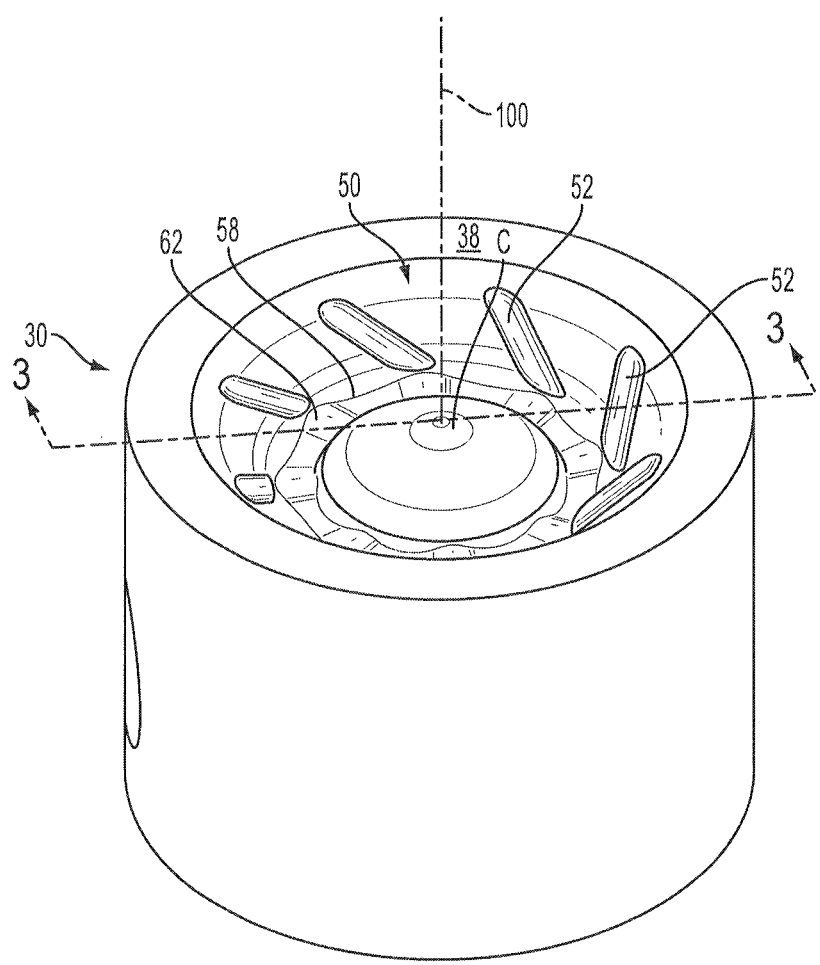
FIG. 2 is a perspective view of the piston of FIG. 1 showing an exemplary bowl shape and an exemplary angled surface feature.

FIG. 2 is a perspective view of the piston of FIG. 1 showing an exemplary bowl 50 which includes a plurality of angled surface features 52 arranged on the inner surface of the wall of the bowl. These surface features 52 in a first embodiment may be angular protrusions extending into the volume of the bowl. These protrusions 52 may extend at an angle from an area adjacent the face 38 of the piston to an area adjacent the lowest point 58 of the bowl. The surface feature may have a constant or variable cross-section but preferably is half-round with the thickness of the cross-section B of feature 52A (see FIG. 7A) between 0.5 and 12.7 mm and all increments between, in 0.1 mm increments. That is, 0.6 mm, 0.7 mm, etc. Accordingly, the surface feature may protrude from the bowl surface by a distance of between 0.5 to 12.7 mm.

It is contemplated that the feature may have a cross-section that is other than half-round, such as half of an ellipse or half of a multi-sided cross-section, such as a 3 to 12 sided cross-section, the sides not necessarily equal in length. Such multi-sided features may protrude and or be recessed in the piston bowl, thereby providing surface characteristics that may direct the spray in a rotational direction, allowing for more mixing time before the fuel hits the cylinder head or reenters into itself by being deflected from the bottom of the piston bowl. In addition, such rotational motion may twist the reflected plumes of spray, lowering the jet-jet interaction. This may then provide for the possibility to utilize additional holes in the injector.

It is further contemplated that the feature 52 may also protrude from or even be recessed into the inner surface of the bowl 50 by more or less than ½ the cross-section of the feature. In other words, with attention to FIG. 7C, the feature may define an arc of 45 degrees, 90 degrees, 180 degrees, 225 degrees, etc. Accordingly, the protruding section could be defined by an arc of 45° to 315°. In addition, FIG. 7B illustrates the feature in a recessed configuration.

Figure 4:
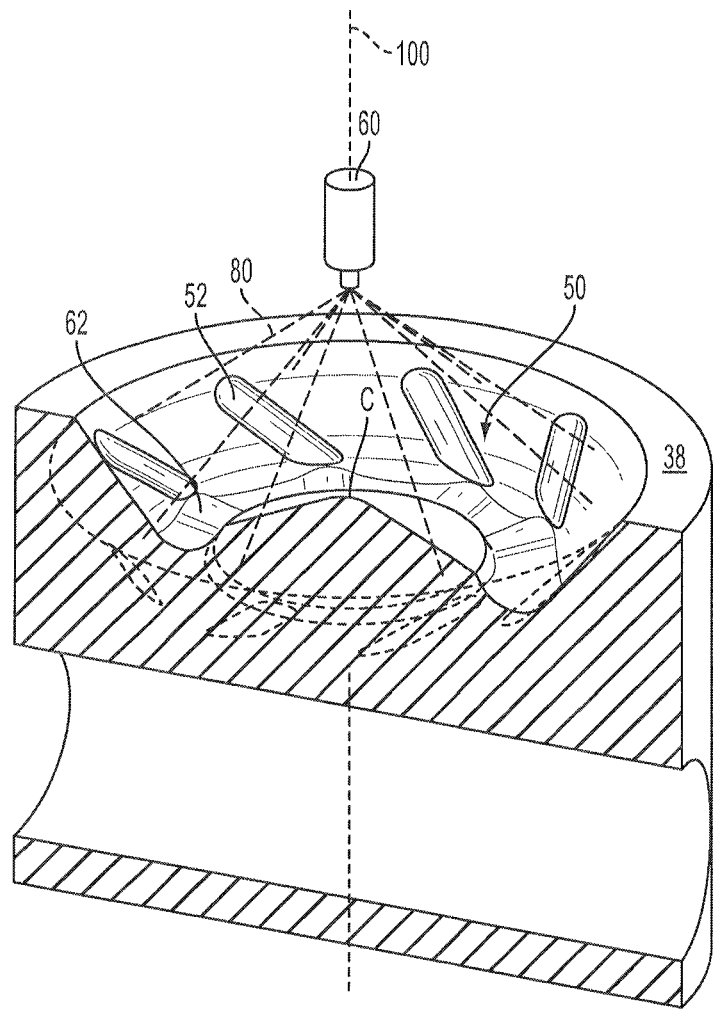
FIG. 4 illustrates a perspective view of a section of the bowl of FIG. 1 further including a central injector and an exemplary conical spray pattern of fuel.
Figure 5A:
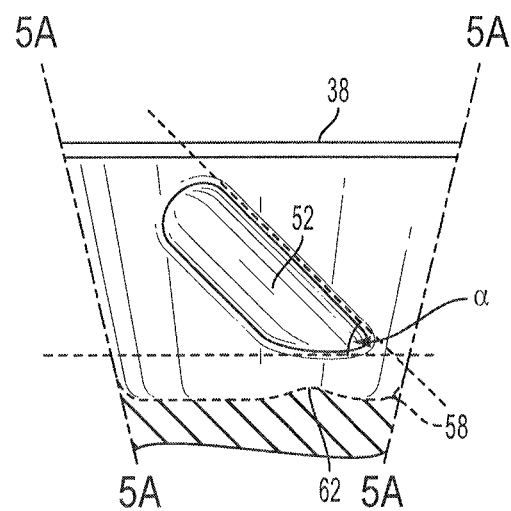
FIG. 5A is a view of the surface feature of FIG. 3 looking from the dome C towards the inner surface of the bowl, the view bounded by lines 5A-5A.

The features 52 may number from 1 to 100 and be disposed at an angle of from 10° to 80° with respect to the plane of the face 38 of the piston, more preferably 20° to 45° (see angle α in FIG. 5A). It is contemplated that the features may be disposed symmetrically or asymmetrically around the bowl 50. Such features 52 represent solid obstacles such that a spray of fuel from an injector 60 (see FIG. 4) engaging such features may provide folding of the spray plumes of fuel-air.

Lower inclination angles, for instance 20°, for the feature 52 may avoid fuel from residing in the low velocity zone behind the dome C. The feature 52 is angled to deflect the spray of fuel in a swirl direction.

Figure 3:
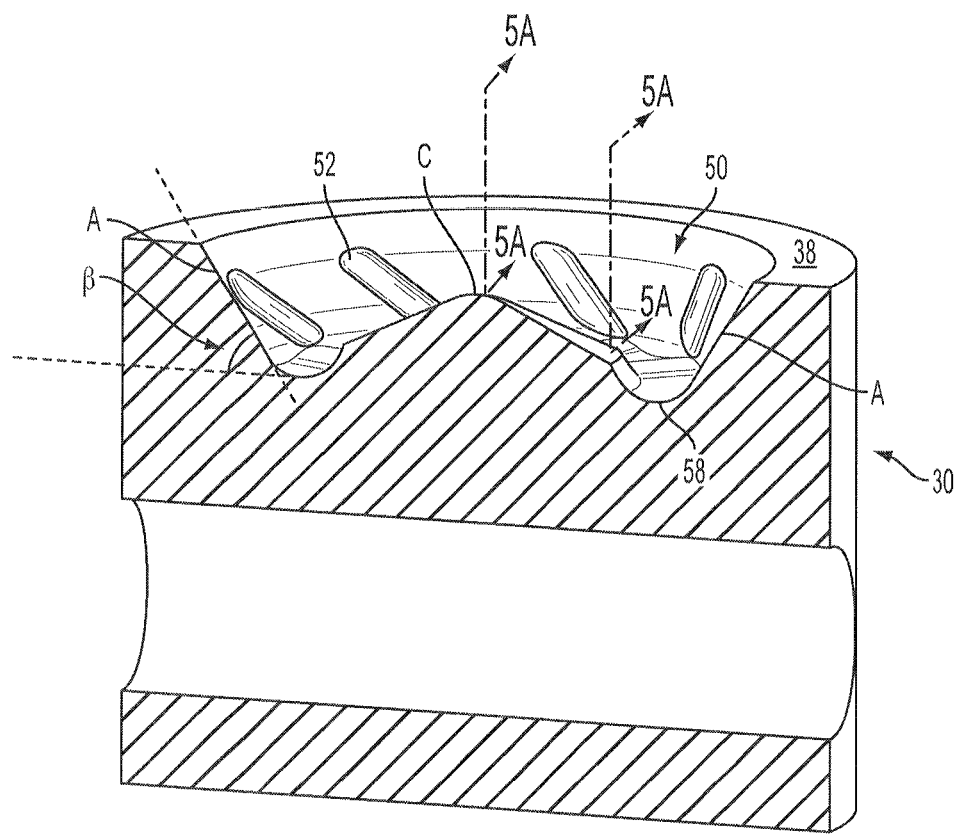
FIG. 3 is a cross-sectional view taken vertically through the center of the exemplary piston of FIG. 2 along line 3-3.

Also shown in FIG. 2 is an additional separation feature 62 which is located below the lower end of the angled surface feature 52 and disposed along the lowest point in the bowl 58. This feature 62 may comprise a relatively small local protrusion which may reduce wall film caused by the diagonal flow of the fuel/air mixture as it is being redirected by the diagonal surface feature 52. The surface feature 52 of FIGS. 2 and 3 is shown in an enlarged view in FIG. 5A, viewed from the dome C within the lines 5A-5A of FIG. 3 and viewed as protruding from the inner wall of the bowl 50. In this view, the additional separation ramp 62 is more visible.

FIG. 3 is a perspective cross-sectional view vertically through the center of the exemplary piston of FIG. 2 along line 3-3 further illustrating the shape of the bowl 50. It should be noted that the surface features 52 may be disposed around at least a portion of the inner surface of the bowl, protruding into the bowl volume. It is further contemplated that the surface feature 52 may be recessed into the inner surface of the bowl (see FIG. 7B) or that some combination of surface features 52 may protrude from and be recessed into the surface of the bowl 50. The bowl 50 may include a sidewall A angled from the face 38 towards the lowest point 58. The angle β of the inner side wall A may therefore vary from 10 degrees to 80 degrees, at 1.0 degree increments with regard to face 38. The bowl dome C may be raised or lowered relative to the face 38 of the piston 30 to accommodate engine timing and maximize the volume of the combustion chamber.

As illustrated in FIG. 4 the spray pattern 80 may be in the shape of a cone radiating from an injector 60 mounted at the centerline 100 of the cylinder head 14 and piston 30 targeting the protruding or recessed surface features 52 arranged around the inside surface of the bowl 50. In this view, the remainder of the bowl is shown in wire-frame to assist in understanding the invention.

Figure 6:
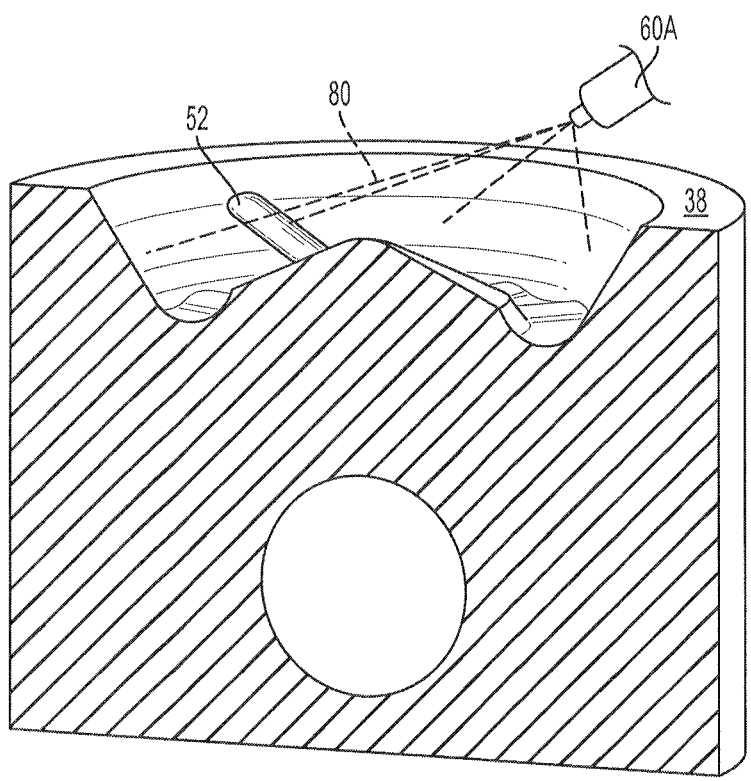
FIG. 6 illustrates another embodiment where an off-center injector sprays fuel at a surface feature in a bowl.

It is contemplated that one or more surface features 52 may be arranged symmetrically or non-symmetrically around the surface of the bowl 50. That is, the features 52 may be arranged in an irregular repeating fashion within the bowl. In addition, the feature 52 may be the target of an injector nozzle 60A which is disposed at any other location that is not on the centerline of the cylinder head. See FIG. 6.

Figure 5B:
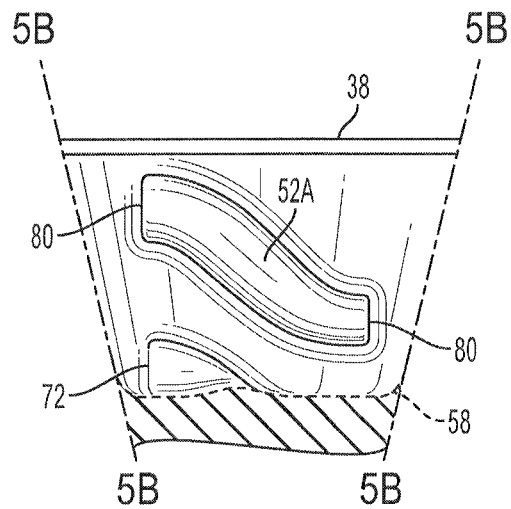
FIG. 5B is a view of a surface feature having a different shape, again looking from the dome C towards the inner surface of the bowl, the view bounded by lines 5A-5A.

FIG. 5B is a view illustrating a different surface feature 52A along lines 5A-5A of FIG. 3 and viewed (similar to FIG. 5A) as protruding from the inner wall of the bowl 50 looking from the dome C of the bowl. Surface feature 52A is shown as protruding from the inner surface of the bowl 50 and having more of an "S" shape with lateral end portions 80. Such shape may allow connection of adjacent features such that one continuous feature may be disposed completely around the bowl (or any portion thereof). See FIG. 7. The height and width of the "S" shape in FIG. 5B may be varied to fit within the volume of the bowl 50. It is contemplated that other continuous shapes and patterns for the protruding or recessing feature may be disposed on/in the inner surface of the bowl.

FIG. 5B further illustrates a more pronounced separation ramp 72 disposed below the higher portion of the "S" shape and above the bottom or lowest point 58 in the bowl. This ramp 72 may further reduce wall film caused by the diagonal flow of the fuel/air mixture as it is being redirected by the diagonal surface feature 52B. Note that the upper portion of 72 may lie essentially parallel to the lower surface of the protruding "S" shape and that the ramp 72 may end essentially at the same point as the surface feature ends. The separation ramp 72 as a protruding feature may lead to better mixing of the fuel spray and inducted air and detachment of the plume from the bowl surface.

Figure 5C:
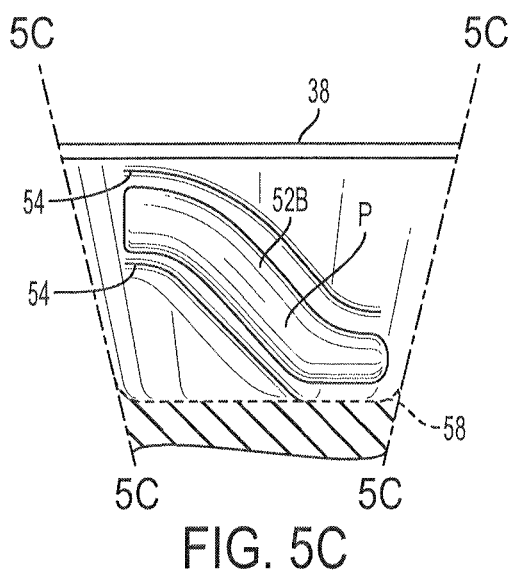
FIG. 5C is a view of a another surface feature having a still different shape, again looking from the dome C towards the inner surface of the bowl, the view bounded by lines 5A-5A.

FIG. 5C illustrates a surface feature 52B similar to that of 52A but bounded by edges 54 to provide separation of the redirected fuel-air jet from the surface of the piston bowl and improve fuel-air mixing (oxygen entrainment). These edges may protrude from the inner surface of the bowl as a projection or be recesses (see FIG. 7B). The edges may be defined by two surface portions 55, 56 (see FIG. 7A) and as having a radius at the peak. The radius of the projection may be in the range of 0.1 mm to 1.5 mm, at 0.01 mm increments. Accordingly, it may have a value of 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm, etc. Preferably, the radius value may be in the range of 0.3 mm to 0.7 mm. The additional separation edges 54 bounding the feature 52B may create different heat release locations and improved mixing. The central portion of the "S" shaped feature 52B shown in FIG. 5C may be disposed at an angle of from 10° to 80° with respect to the horizontal plane of the face 38 of the piston, more preferably 20° to 45°. The central portion may be understood as the linear portion P of the surface feature which is angled with respect to the bowl face.

Figure 7:
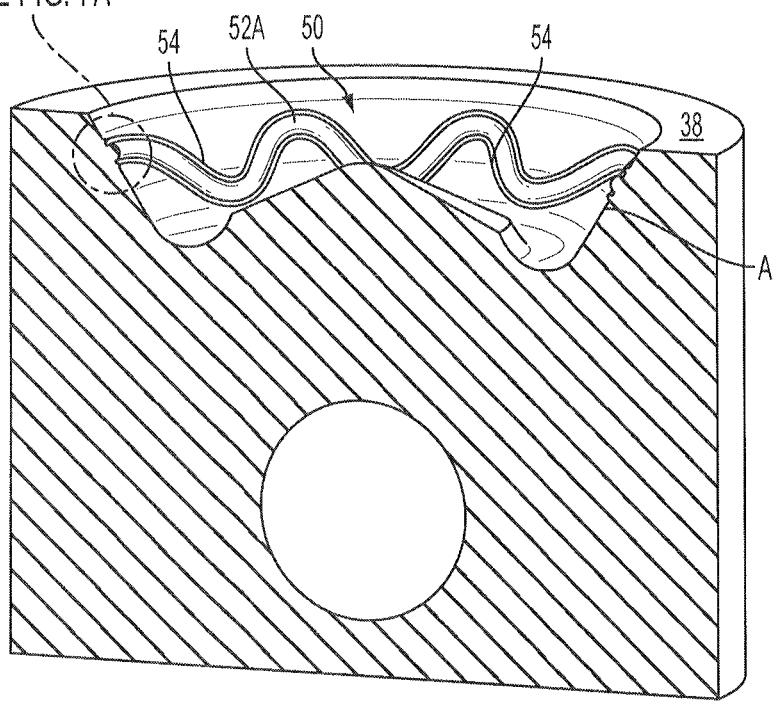
FIG. 7 is another partial cross-sectional view of a piston similar to that of FIG. 3, but illustrating a continuous geometric shape for the surface feature of FIG. 5C.

FIG. 7 is a partial cross-sectional view of a piston similar to that of FIG. 3, but illustrating a continuous geometric "S" shape for the surface feature 52A of FIG. 5C. In addition, edges 54 are indicated as bounding the feature 52. This combination of surface geometries disposed within a piston bowl may reduce soot formation and improve fuel/air mixing.

Figure 7A:
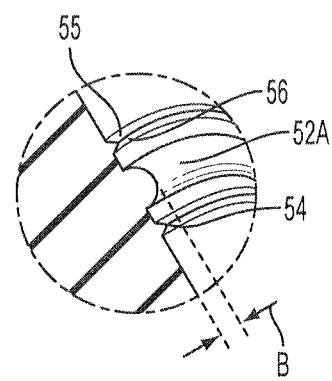
FIG. 7A is an enlarged view of the circled area of FIG. 7, illustrating a cross-section of a protruding surface feature 52A shown in FIG. 5C.
Figure 7B:
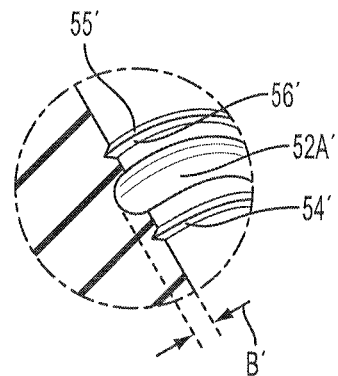
FIG. 7B is an enlarged view of a circled area similar to that of FIG. 7, illustrating a cross-section of a recessed surface feature 52A' similar to that shown in FIG. 5C.
Figure 7C:
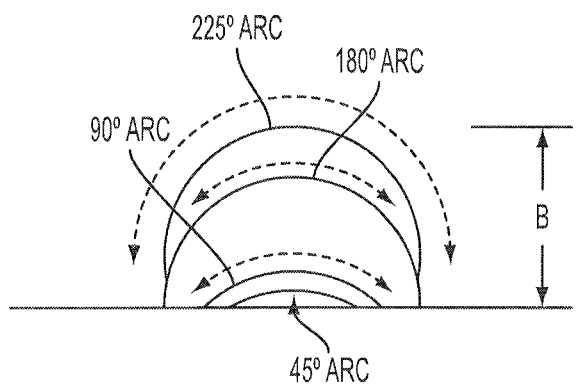
FIG. 7C is an enlarged view of the cross-section of surface feature 52A shown in FIG. 7A illustrating various arc shapes.

FIG. 7A is an enlarged view of surface feature 52 of FIG. 7, further illustrating the surface portions 55, 56 of edge 54.

The use of 3-dimensional spray-wall interactions through the use of geometric surface features as targets for the spray jets as disclosed herein may provide an approach to reduce two major causes of soot: the wetted wall area and the interaction between the individual fuel jets. This reduction may be achieved by introducing the above referenced target geometries into the surface of the piston bowl which then direct the spray in a rotational direction, allowing for more mixing time before the fuel hits the cylinder head or reenters into itself by being deflected off the cylinder bottom. This then may result in particulate matter emissions being reduced. Jet to jet interaction may also be lowered.

Figure 8:
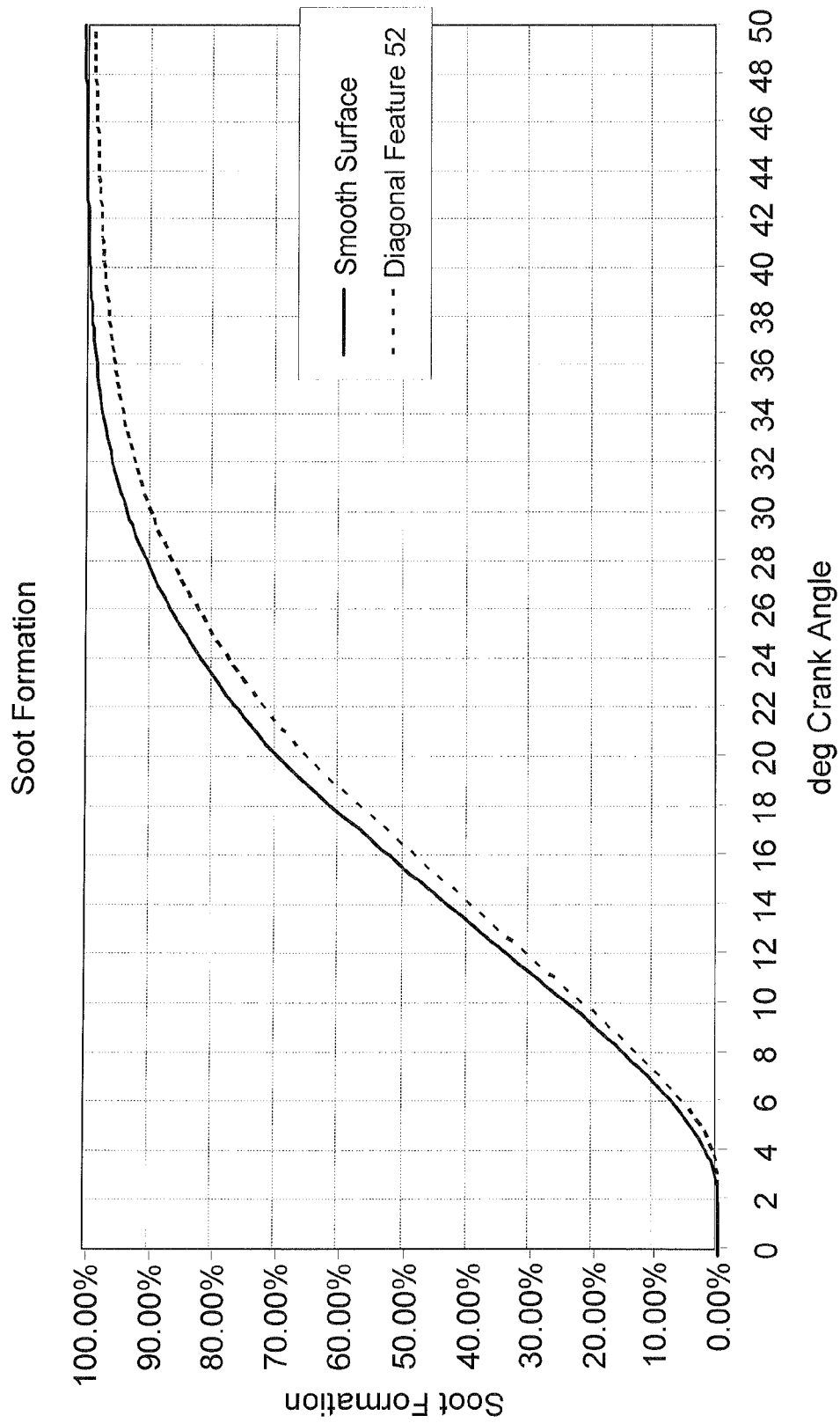
FIG. 8 is a plot of soot formation vs. crank angle and illustrates the relative performance of a simulated piston bowl without surface features compared to one that includes an angled surface feature.

Attention is directed to FIG. 8 which is a graph of soot formation vs. crank angle in degrees for a simulated spray chamber using CFD modeling wherein a smooth bowl (upper curve) compared to a bowl as shown in FIG. 2 having diagonal features (lower curve). Note that the inclusion of angled surface features as described herein provide lower amounts of soot formation at all crank angles from 3-50°.

As can now be seen, the piston bowl design disclosed herein includes an angled surface feature disposed as protruding or recessed into the inner wall of the piston bowl. The surface feature 52, 52A may split the fuel jet which then divides and guides the fuel to a region nearer the top of the piston bowl and to a region within the lower portion of the piston bowl.

Such a piston bowl design utilizes jet momentum to improve mixing of fuel and air. The select shapes for the surface feature may conserve momentum and improve fuel-jet motion so that adequate momentum is retained for separation of the fuel-air plume, late in combustion, when the flame exits from the piston bottom area. Additionally, the radii, angle and design of the separation features 52, 52A, 54, 62 and 72 insure adequate separation of the fuel-air jet from the bowl without steering the jet to re-entrain with the main injection event.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A piston for a direct injection engine, the piston comprising:
   a bowl at an upper end, the bowl forming a portion of a combustion chamber, wherein the piston has a top face defining a plane and the bowl includes an inner surface that defines a volume configured to receive a fuel-air mixture;
   the inner surface of the bowl including a sidewall surface which extends from the top face of the piston to a bottom of the bowl, said sidewall surface from the top face of the piston to the bottom of the bowl formed at an angle β relative to said plane of said top face, said angle β in a range from 10° and 80 20 relative to said plane of said top face;
   at least one first surface feature comprising a protrusion from said sidewall surface as a target for fuel spray, the at least one first surface feature including a central portion angled between 20° and 80° from said plane of said top face and having a cross-section that protrudes from said sidewall surface by 0.5mm to 12.7 mm, wherein at least one edge formed as a projection is disposed adjacent the top and bottom and along the central portion of the at least one first surface feature;
   wherein said bowl includes a central axis and a dome portion is arranged at said central axis;
   wherein said inner surface of the bowl includes at least one second surface feature different from said at least one first surface feature;
   wherein said at least one second surface feature protrudes from said inner surface of the bowl from a location that is disposed below said at least one first surface feature of the bowl;
   wherein said at least one second surface feature is located on the bottom of the bowl; and
   wherein said at least one second surface feature comprises a separation ramp which protrudes from a lowest point of the bottom of the bowl.

2. The piston of claim 1 wherein said central portion is angled 20° to 45° from said piston face.

3. The piston of claim 1 wherein the cross-section of said at least one first surface feature is constant.

4. The piston of claim 1 wherein the cross-section of said at least one first surface feature is varied.

5. The piston of claim 1 wherein said recess or projection has a radius of 0.5 mm to 1.5 mm.

6. The piston of claim piston of claim 1 wherein said at least one first surface feature has a cross-section comprising a portion of a circle, an ellipse or a multi-sided shape.

7. The piston of claim 1 wherein said at least one surface feature is configured to engage with said fuel spray and provides oxygen entrainment and fuel separation.

8. The piston of claim 1 wherein there are a plurality of said first surface features which are connected together to form a continuous feature around said surface of said bowl.

* * * * *